March 7, 1961 H. S. WILSON 2,973,837
COMBINED AUTOMATIC ADJUSTOR AND RETRACTION MEANS
Filed March 13, 1957 2 Sheets-Sheet 2
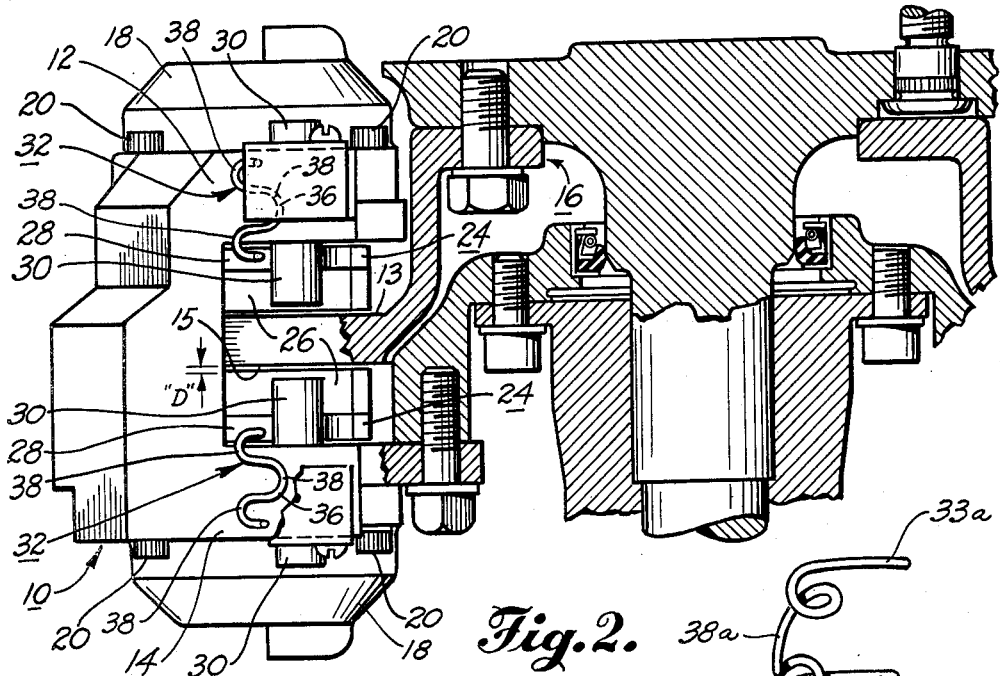
Fig.2.
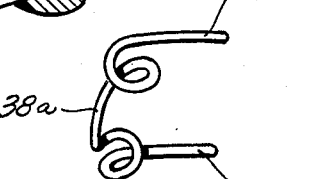
Fig.5.
Fig.4.
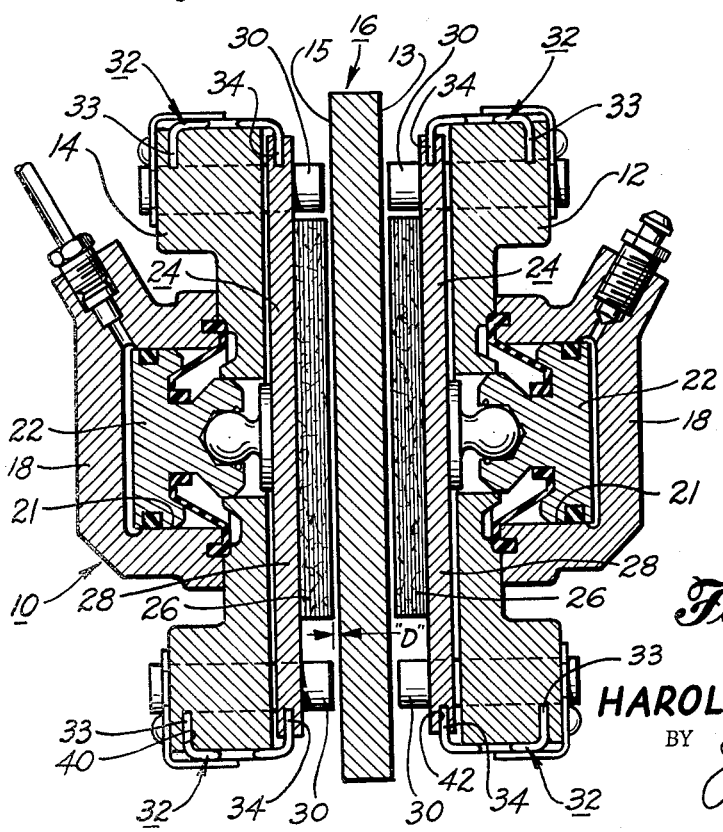
Fig.3.
INVENTOR.
HAROLD S. WILSON.
BY John A. Young
ATTORNEY United States Patent Office 2,973,837
Patented Mar. 7, 1961

2,973,837

COMBINED AUTOMATIC ADJUSTOR AND RETRACTION MEANS

Harold S. Wilson, South Bend, Ind., assignor to The Bendix Corporation, a corporation of Delaware Filed Mar. 13, 1957, Ser. No. 645,715

2 Claims. (Cl. 188—73)

This invention relates to an automatic adjuster for a rectilinearly movable friction element or friction elements, the purpose of the invention being to maintain an established running clearance of the friction element or friction elements from a relatively rotatable member regardless of the extent of friction element wear which is normally incident to usage thereof.

In addition to the usual functional requirements of an automatic adjuster, there are numerous structural requirements which are dictated by brake design. The brake adjuster must be locatable according to the dictates of the shape and general design of the other components of the brake, and these available spaces are invariably limited and usually cramped. There are special problems of fitting an adjuster into a caliper type brake in which, by virtue of the size of the friction elements and housing, there is only a slight space available.

Another factor which must be taken into account in judging the value of an automatic adjuster is its cost of manufacture. While there are numerous automatic adjusters which will operate satisfactorily, they are often prohibitive in cost either because of complexity in design or because of necessary refinements in the brake structure.

I propose the use of a very simple automatic adjuster which comprises a deformable wire which will function both as a retracting means and as an automatic adjuster for a friction element of the brake. This automatic adjuster, as far as I am aware, can be supplied at a lower cost than any previously existing automatic adjuster, and it can be fitted into locations of the brake structure which would prohibit previously used adjusters.

From the standpoint of performance of the adjuster, there is provided the advantages of consistency in performance, complete reliability in performance (there are no moving parts which are subject to malfunctioning) and accuracy in operation. The operational accuracy is attributable in part at least to the fact that the adjuster is not affected to any substantial extent by braking heats.

Other objects and features of the invention will become apparent from a consideration of the following description, which proceeds with reference to the accompanying drawings, wherein:

Figure 2 is an end view of the brake shown in Figure 1, looking in the direction indicated by the arrows 2—2 in Figure 1;

Figure 3 is a section view of the brake shown in Figure 1, taken on section line 3—3 of Figure 1;

Figure 4 is an enlarged detail view of the automatic adjuster; and,

Figure 5 is an enlarged detail view of a second embodiment of the invention.

Figure 1:
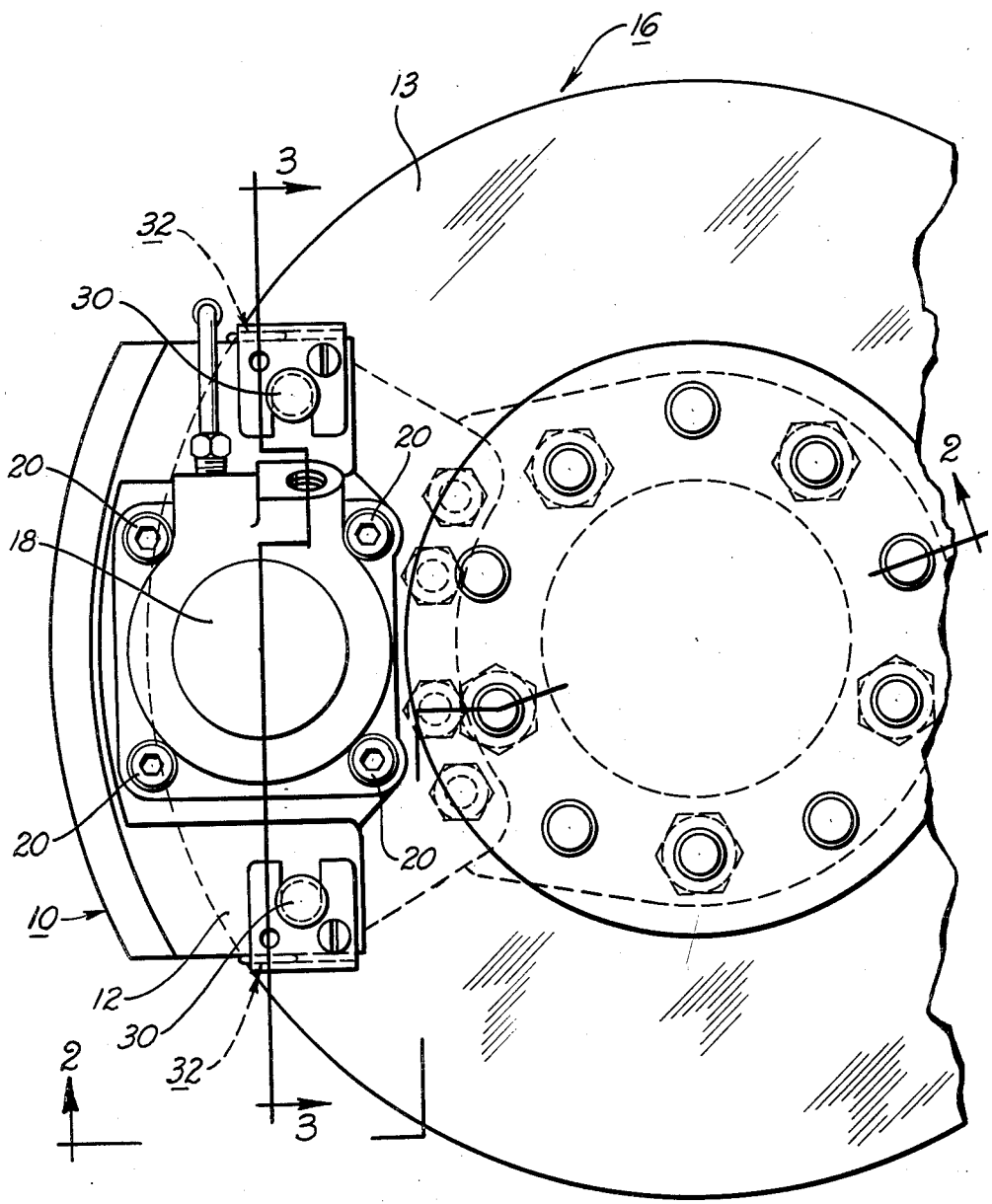
Figure 1 is a side elevation of the brake (with a portion of the rotor broken away) which incorporates the present invention.

Referring to the drawings, the brake comprises a housing 10 having limbs 12 and 14 extending closely adjacent each of the braking surfaces 13 and 15 of rotor 16. Fluid motors 18 are bolted, or otherwise suitably secured as indicated by reference numeral 20, to the respective limbs. Each of the fluid motors includes a cylinder bore 21 and an axially movable piston 22 within the cylinder bore 21 which bears against an associated friction member 24.

Each friction member 24 includes a pad of friction material lining 26 which is bonded or riveted to a backing member 28. Each backing member 28 is slidably associated at the ends thereof with axially extending guide members 30 which are mounted in the limbs 12 and 14 of the caliper and terminate in close proximity to the sides 13 and 15 of the rotor in order to ensure complete utilization of the lining 26.

Also associated at the remote ends of each friction member are two return springs 32 which also function to automatically adjust the retracted position of the friction member responsively to wear of the lining 26.

Referring to Figure 4, it will be seen that there are two transverse segments 33 and 34 which are formed at the ends of a sinuously constructed portion 36 having a number of oppositely curving loops 38. In construction, the return spring consists of a very soft annealed metallic wire. I have used with satisfactory results a steel wire which is SAE 1008 material designation.

One of the properties of the wire is that it is plastically deformable, that is the curvature of loops 38 can be made flatter with the net result that bending of the loops causes an elongation of the return spring without changing the cross-sectional area thereof. This process of straightening the return spring responsively to lateral movement of the friction member does not impose tensile force on the return spring, but instead exerts a bending force on the loops resulting in a flatter curvature of the loops 38.

Referring to Figure 3, the one end segment 33 of the return spring is received in an opening 40 in the limb of the caliper, while the other end segment 34 is fitted within an opening 42 in the backing member 28.

It has been discovered that movement of the friction member relatively to its associated limb which is in excess of a predetermined amount, can cause the return spring to elongate as described. Movement of the friction member in excess of the predetermined amount will cause the spring to permanently assume a new shape sometimes referred to as its "re-set" position. The explanation for this is that the spring is stressed beyond its elastic limits by movement of the friction member so that once the wire spring re-forms to a new configuration it will retain this configuration because of plastic deformation. Even when the spring has been stressed by movement of the friction member in excess of a predetermined amount, it will retain a residual elasticity which, upon de-actuation of the fluid motors, will exert a retractile force on the friction members, causing the friction members to be withdrawn through an established distance indicated as D in Figures 2 and 3.

When the brake is applied, the fluid motors 18 are energized thus forcibly engaging the lining 26 on either side of the rotor with the adjacent annular surfaces of the rotor. As the friction material lining wears incidentally to this friction engagement, the friction member will move an amount in excess of the established running clearance D between the lining 26 and the adjacent surface of the rotor. When this wear of the lining occurs, there will be a stretching force exerted on the spring 32 through ends 33 and 34, and this spring, once having been loaded by movement of the friction member beyond the running distance D, will then begin to plastically deform since it is stressed beyond its elastic limit.

When the fluid motors are de-actuated, the return spring 32 will exert retractile force on the friction member determined by the residual elasticity in the spring, with the net result that the friction member is retracted through the established running clearance D even though total movement of the friction member, owing to wear, has moved axially through a distance in excess of the distance D. This is explainable on the basis that movement of the friction member through the distance D is the limit of elastic deformation of the spring, and the spring will thereafter plastically deform to a new elongated position and will retain or "set" in this new position even after applying force on the friction member has been relieved.

The over-all length of the wire from end 33 to end 34 is greater than the maximum travel of the friction members required to completely utilize the friction lining. Assuming an initial lining thickness of approximately 7/16 of an inch, the wire is constructed so that it can elongate an amount equal to the thickness of the lining segment without developing tensile force on the wire, which would result if the spring was bent from its original shape into a completely straight, or nearly straight, condition.

Another requirement of the return spring is that it retains substantially the same elasticity both in its original shape and in its final shape when the lining has nearly worn. Thus, the spring will be elastically deformable through the same elongation increment, equalling the distance D, and will thereafter be plastically deformable. By so providing this, it is possible to achieve the same extent of retraction of the friction member, both at the start of the brake operation when the lining has its original thickness, and at the end of the brake operation, when the lining segment has worn closely to the backing member 28.

The configuration of the wire is important since its shape can determine the locations of stress concentrations which are utilized to achieve plastic deformation thereof, once the friction member has moved in excess of the established running clearance.

Another shape of the wire which we have found to be satisfactory is shown in Figure 5. The ends 32a and 33a in this case are coiled so there is developed a torsional force within the wire. There is a single loop 38a joining the coiled ends 32a and 33a which are fastened to the friction member and limb, respectively.

It has been found that the force required to straighten the wire is not so great that it unduly detracts from the brake applying force developed by the fluid motor actuator. It is important to have a sufficiently soft wire so that resistance to bending, both in the plastic and the elastic phase, will not unduly increase the force requirements of brake applying pressure or unduly subtract from available brake applying pressures which are necessary to apply the friction lining against the opposite faces of the rotor.

The constant flexing of the wire spring can result in a change of its properties so that it becomes inconstant in the amount of retraction force exerted on the friction member. This is undesirable, and is attributed to a "work-hardening" of the spring. The problem is remedied by suitable construction of the loops in the spring. V-shaped convolutions will have a marked tendency to produce objectionable "work-hardening," but is correctable by providing loops which distribute the stress concentration sufficiently to avoid localized overworked portions of the wire which will change in physical properties.

The cross section of the wire may vary from round to square, triangular, oval, etc. It has been found that variations in brake design dictate corresponding changes in the spring adjuster. The characteristics of the spring are determined by the shape (profile, and cross section) and properties of material (determined by kind of material and its processing history which determine strength, modulus of elasticity, etc.).

The extent of retraction of the friction member is controllable to an extent by suitable construction of the wire adjuster. For example, a looped shape of large radius produces more uniform stress distribution within the wire which is distorted more within the elastic limit thereof, this elasticity serving as the retraction force on the friction member.

In retracting the friction member some resistance is normally encountered, but an adequate retracting force can be arrived at by providing the necessary cross-sectional size for the spring which will develop greater retracting forces as the cross-sectional size increases. Another manner of increasing the retractile force is by increasing the number of adjusters.

In providing the desired retracting and adjusting characteristics, the profile of the spring is the determinate factor. As a general rule, in order to maintain increased running clearance there would be provided an increase in length of the adjuster and reduced bending concentration.

Although the invention has been described in connection with certain selected embodiments, it will be understood by those skilled in the art that the principles of the invention are general in nature. It is intended, therefore, that such variations and revisions of the invention which are reasonably to be expected from those skilled in the art, and which incorporate the herein disclosed principles, will be within the scope of the following claims.

I claim:

1. In a brake, having a rotor with oppositely facing annular braking surfaces and a housing including limbs extending on each of the opposite sides of said rotor and spaced closely adjacent therewith; a friction member between each limb and an annular surface of said rotor, anchoring means projecting from each of the limbs and extending toward the rotor surface to provide anchoring and bearing surfaces slidably supporting the weight of each of said friction members which are rectilinearly movable on their bearings surfaces in engagement with said anchoring means, and adjusting means at each of the anchored ends of said friction members and each comprising a soft annealed wire held at one end by said friction limb and at the other end by said friction member, each wire including a plurality of oppositely curving arcuate loops constructed in succession along the length of said wire, bendable arcuate segments of said wire interconnecting successive arcuate loops whereby flexing of said wire responsive to movement of said friction members develops substantially minimal work hardening of said wire to maintain the original elasticity thereof, transversely bent portions at the remote ends of the wire, and sockets in said limb and friction member for receiving the ends of each wire, each said wire being straightenable by applying movement of the friction member and plastically deformable beyond its elastic limit by movement of the friction member in excess of its running clearance from the opposed rotor surface, segments of each wire being stressed within the elastic limit thereof to exert retractile force on the friction member for retracting it a fixed amount irrespective of the extent of plastic deformation of said wire whereby the running clearance of the friction member is substantially maintained.

2. In a brake having a rotor with opposite annular braking surfaces, a housing with limbs extending one on each side of the braking surfaces of said rotor and in closely spaced adjacent relation therewith; two friction members one on each side of said rotor and disposed between a respective limb and braking surface of the rotor, anchoring means extending laterally from each limb and providing anchoring and supporting surfaces at each of the remote ends of said friction members and slidably supporting said friction members thereon, an automatic adjuster at each of the anchored ends of said friction member adjacent its anchor and comprising a relatively thin wire having a plurality of successively formed loops and coils constructed along the length thereof, said wire being secured at one end to the limb and at the opposite end to said friction member, said wire being plastically deformable by movement of the friction member and thereby reformed in shape in accordance with the extent of movement of the friction member, said loops and coils being deformable by reciprocable movement of said friction member and having the stress thereof distributed sufficiently over the length of the wire to effect minimal hard working effecting the resilience of said wire, each wire retaining sufficient residual resilience in its various re-formed shapes to exert retracticle force on the friction member to define a retracted position of the friction member at a predetermined substantially constant clearance from its braking surface regardless of the protractile movement of the friction member producing deformation of the wire.

References Cited in the file of this patent

UNITED STATES PATENTS

| | | |
|---|---|---|
| 1,901,437 | Crone | Mar. 14, 1933 |
| 2,086,538 | Dabney | July 13, 1937 |
| 2,196,396 | Lane | Apr. 9, 1940 |
| 2,743,790 | Bricker | May 1, 1956 |

FOREIGN PATENTS

| | | |
|---|---|---|
| 747,972 | Great Britain | Apr. 18, 1956 |